United States Patent [19]

Wreford-Howard

[11] Patent Number: 4,673,976
[45] Date of Patent: Jun. 16, 1987

[54] CABLE TELEVISION SYSTEM DATA VERIFICATION APPARATUS

[75] Inventor: David Wreford-Howard, Englewood, Colo.

[73] Assignee: American Television & Communications Corporation, Englewood, Colo.

[21] Appl. No.: 615,778

[22] Filed: May 31, 1984

[51] Int. Cl.[4] .................. H04N 7/167; H04J 1/16; H04L 5/14
[52] U.S. Cl. ........................ 358/10; 358/86; 364/200; 370/15; 371/34; 455/5; 380/2; 380/10; 324/58 B
[58] Field of Search ............... 364/200; 371/34; 358/122, 86; 455/5; 370/15

[56] References Cited

U.S. PATENT DOCUMENTS

| | | | |
|---|---|---|---|
| 3,050,712 | 8/1962 | Bruck | 340/150 |
| 3,230,302 | 1/1966 | Bruck | 178/5.1 |
| 3,387,082 | 6/1968 | Farber | 178/6 |
| 3,668,307 | 6/1972 | Face et al. | 178/5.6 |
| 3,733,430 | 5/1973 | Thompson | 178/5.1 |
| 3,757,035 | 9/1973 | Sullivan | 178/6 |
| 3,786,424 | 1/1974 | McVoy et al. | 340/151 |
| 3,803,491 | 4/1974 | Osborn | 325/53 |
| 3,805,234 | 4/1974 | Masters | 371/34 |
| 3,859,596 | 1/1975 | Jannery | 325/31 |
| 3,987,397 | 10/1976 | Belcher et al. | 325/308 |
| 3,990,012 | 11/1976 | Karnes | 325/308 |
| 3,993,995 | 11/1976 | Belcher et al. | 325/308 |
| 4,002,843 | 1/1977 | Rackman | 179/15 AL |
| 4,030,072 | 6/1977 | Bjornsson | 364/200 |
| 4,082,922 | 4/1978 | Chu | 179/15 BA |
| 4,118,669 | 10/1978 | Fung | 325/309 |
| 4,156,847 | 5/1979 | Tazawa et al. | 325/308 |
| 4,290,142 | 9/1981 | Schnee et al. | 455/3 |
| 4,322,854 | 3/1982 | Bundens | 455/5 |
| 4,343,042 | 8/1982 | Schrock | 455/5 |
| 4,351,059 | 9/1982 | Gregoire et al. | 371/34 |
| 4,361,903 | 11/1982 | Ohta | 455/2 |
| 4,450,481 | 5/1984 | Dickinson | 358/114 |
| 4,455,538 | 6/1984 | Toriumi | 358/86 |
| 4,466,001 | 8/1984 | Moore et al. | 340/825.08 |
| 4,475,123 | 10/1984 | Dumbauld et al. | 358/114 |
| 4,484,218 | 11/1984 | Boland | 358/86 |
| 4,494,111 | 1/1985 | Rocci et al. | 340/533 |
| 4,520,508 | 5/1985 | Reichert, Jr. | 455/4 |
| 4,530,008 | 7/1985 | McVoy | 358/122 |
| 4,533,948 | 8/1985 | McNamara et al. | 455/5 |

FOREIGN PATENT DOCUMENTS 0019287 11/1980 European Pat. Off. .
0103438 3/1984 European Pat. Off. .

OTHER PUBLICATIONS

"Application Note Deltakabel Starnetwork Coaxial Version", by DeltaKabel bv.
"Cable Television in Broadband Systems", by DeltaKabel bv.
"Mini-Star Network with Selection Facilities and Computer Control", by DeltaKabel bv.
"SCAT Series 10 Converter Off-Premises Addressable Control: Second Generation", by Joseph P. Preschutti.
"Packetcable: A New Interactive Cable System Technology", by Paul Baran, 31st Annual NCTA Convention Official Transcript, 1982.
"Kabel tv Experimenten Limburg", by DeltaKabel bv.
"Two Way Cable Experiment", Limburg International Magazine, vol. 3, No. 2, Apr./May 1982, pp. cover, 2, 7-9, 24-25.
"Plessey Scientific-Atlanta Multistar System Technical Description".

(List continued on next page.)

Primary Examiner—Stephen C. Buczinski
Attorney, Agent, or Firm—Laurence S. Rogers; Jeffrey H. Ingerman

[57] ABSTRACT

In a cable television system in which the individual subscriber's converter/tuner is located outside the subscriber's premises in an external control unit ("ECU") and controlled remotely via a subscriber processing unit ("SPU") connected to the ECU by a drop cable, data transmitted from the SPU to the ECU (e.g., channel selection data) is verified by transmitting similar echo back data from the ECU to the SPU. The SPU compares the original and echo back data to assure that the ECU correctly received the original data.

7 Claims, 6 Drawing Figures

OTHER PUBLICATIONS

"ATC, Toshiba Announce Plans to Produce New Cable Product", *ATC News*, Nov. 10, 1982.

"DST Unit Offers Cable Industry Desirable Features", *ATC News*, Nov. 10, 1982.

"Jerrold Introduces STARCOM IntraNet a Cost-Effective Off-Premises Addressable Converter System", by General Instrument.

"The Next Generation in Cable Systems", by Times Fiber Communications, Inc.

"Two-Way Applications for Cable Television Systems in the '70s", *IEEE Spectrum*, Nov. 1971, pp. 39-54.

"Just in Time for the Future", by Pico Products Inc.

"Out Of-Home Addressable Security is Now a Reality", by Vitek Electronics, Inc.

"The Subscriber Response System", by R. T. Callais et al., *20th Annual NCTA Convention Official Transcript*, Jul. 1971, pp. 28-48.

"Tocom System Bi-Directional Cable Television Information and Control Transmission System", by William F. Osborn, *20th Annual NCTA Convention Official Transcript*, Jul. 1971, pp. 507-529.

"The Total Communication Concept for the Future", by E. J. Gargini, The Royal Television Society Journal, Mar./Apr. 1973, pp. 182-193.

"High-Speed Polling System for Multi Purpose CATV", by Ken'ichi Hiratsuka et al., *Japan Telecommunications Review*, Jan. 1977, pp. 20-28.

"Mini-Hub Addressable Distribution System for Hi--Rise Application", M. F. Mesiya, IEEE 1982.

CABLE TELEVISION SYSTEM DATA VERIFICATION APPARATUS

BACKGROUND OF THE INVENTION

This invention relates to cable television ("CATV") systems, and more particularly to apparatus for verifying that data transmitted in a CATV system for such purposes as system control is correctly transmitted and received.

In a conventional CATV system, a head end transmits CATV signals along a trunk cable. Connected to the trunk cable are feeder cables, to which in turn are connected drop cables. The drop cables connect the feeder lines to converter/tuner units located in subscribers' houses. When a subscriber desires to tune to and view a particular TV channel, he or she keys the requested channel into the converter/tuner. If the subscriber has subscribed with the CATV service company for the requested channel, the converter/tuner tunes the selected channel from among a plurality of channels available on the drop cable and converts the selected channel to a form and frequency suitable for viewing on the subscriber's television set. If the subscriber has not subscribed for the requested channel, the converter/tuner will not tune to or enable the viewing of the requested channel.

At least two difficulties arise with a conventional CATV system as described above. First, the subscriber may modify the converter/tuner to allow the subscriber to view CATV channels for which the subscriber has not subscribed, thus resulting in a loss of revenue to the CATV service company. Second, the subscriber may remove the expensive converter/tuner. Again, the CATV service company incurs a loss.

To solve these problems of modification and removal of the converter/tuner, it is possible to design a CATV system in which the expensive converter/tuner is removed from the subscriber's house and placed in an external control unit mounted, e.g., on or adjacent to a nearby telephone or utility pole. Each external control unit may include a plurality of converter/tuners, each connected to a respective one of a plurality of subscribers' houses by a respective one of a plurality of drop cables. In each subscriber's house is a subscriber processing unit which connects to the subscriber's drop cable and to the subscriber's television set. The subscriber may key into the subscriber processing unit a TV channel request. Thereupon, the subscriber processing unit transmits the request to the external control unit via the drop cable in the form of a modulated data signal. If the subscriber is authorized to view the requested channel (i.e., if the subscriber has subscribed and paid for the channel), the converter/tuner located in the external control unit which is associated with the subscriber tunes to the requested channel and transmits the channel to the subscriber via the drop cable.

Although the foregoing CATV system solves the problems of modification and removal of converter/tuners, problems may occur in communicating channel requests from the subscriber processing unit to the external control unit. For example, noise or poor connections along the communication path between the external control unit and the subscriber processing unit may degrade or modify the data signal containing the subscriber's TV channel request. As a result, a different channel request from the actual channel request might be received by the external control unit, or no channel request might be received. In either case, the subscriber does not receive the TV channel which he keyed into his subscriber processing unit.

SUMMARY OF THE INVENTION

The present invention has been made in consideration of the above situation, and has for its object to provide data verification apparatus for use in confirming that data transmitted in a CATV system is correctly transmitted and received. In the illustrative embodiment shown and described in detail herein, data transmitted by a subscriber processing unit is stored by the subscriber processing unit as well as being transmitted to the associated external control unit via the associated drop cable. The external control unit receives and stores the data it receives. The external control unit also retransmits to the subscriber processing unit the data it has stored. The subscriber processing unit receives the retransmitted data, stores that data, and compares the stored original data to the stored retransmitted data. The subscriber processing unit produces an output indication indicating whether or not the original and retransmitted data are the same. For example, if the original and retransmitted data are the same, the subscriber processing unit may visually display that data. Otherwise the subscriber processing unit may visually display an error message.

DETAILED DESCRIPTION OF THE PREFERRED EMBODIMENTS

The present invention has particular application for use in CATV systems in which the converter/tuners are located outside the subscribers' houses in external control units ("ECUs"). A subscriber may communicate with the external control unit associated with the subscriber's house by use of an inhome subscriber processing unit ("SPU").

Figure 1:
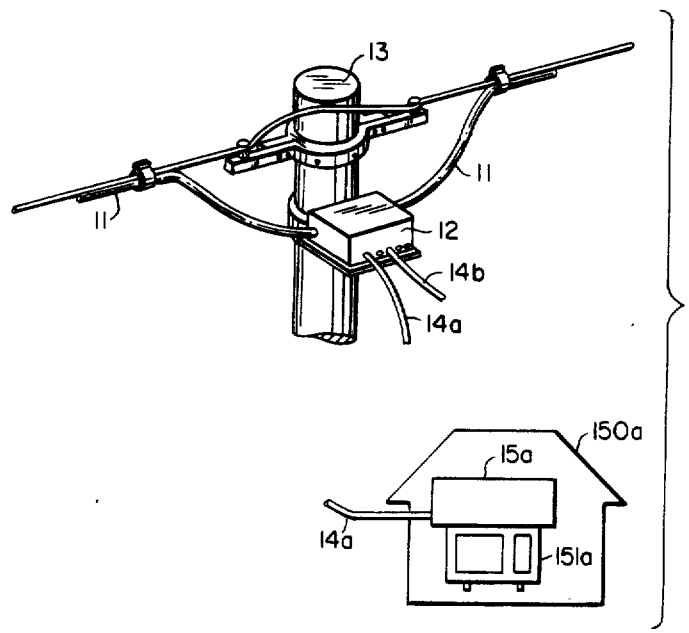
FIG. 1 illustrates the overall configuration of a terminal of a CATV system in which the present invention may be used.

FIG. 1 shows the overall configuration of such a CATV system. Reference numeral 11 denotes a CATV feeder line. External control unit 12 is located along feeder line 11 on or adjacent to telephone or utility pole 13. Drop cable 14a is drawn from external control unit 12 to the premises 150a of a subscriber. Other drop cables 14b, etc. connect external control unit 12 to the premises of other nearby subscribers. Subscriber processing unit 15a, installed as an indoor unit in the subscriber's house, is attached to drop cable 14a and to television set 151a.

Figure 2:
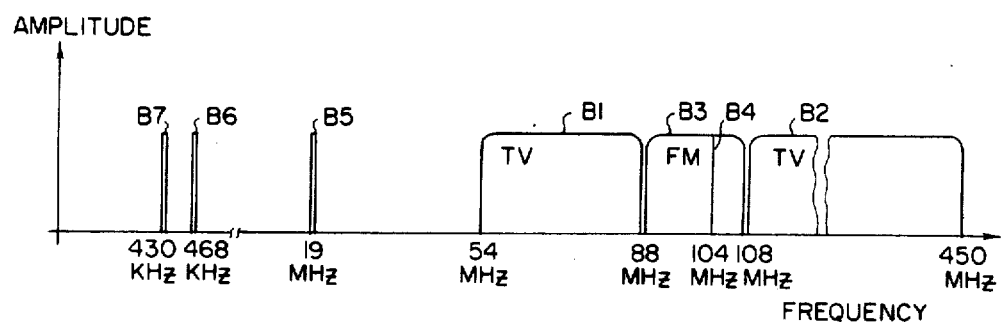
FIG. 2 is an illustration of the spectral characteristics of CATV signals used in the CATV system of FIG. 1.

FIG. 2 shows typical frequency bands employed in the CATV system of FIG. 1. A low band B1 of television signals falls within the range between 54 MHz and 88 MHz, and a high band B2 of television signals falls within the range between 108 MHz and 450 MHz. Television signals on as many as 66 channels are transmitted within the ranges of bands B1 and B2. FM audio signals are transmitted in band B3 between 88 MHz and 108 MHz. In addition to these bands, band B4 at approximately 104 MHz is used for transmitting so-called forward data (e.g., individual subscriber data and control data) from the head end of the CATV system to the external control units 12 in the system. Band B5 at approximately 19 MHz is used to transmit so-called reverse data from external control units 12 to the head end. Band B6 at approximately 468 KHz is used to transmit data (e.g., channel selection requests) from each subscriber processing unit 15 to the associated external control unit 12. Band B7 at approximately 430 KHz is used to transmit data from the external control units 12 to the associated subscriber processing units 15.

Figure 3:
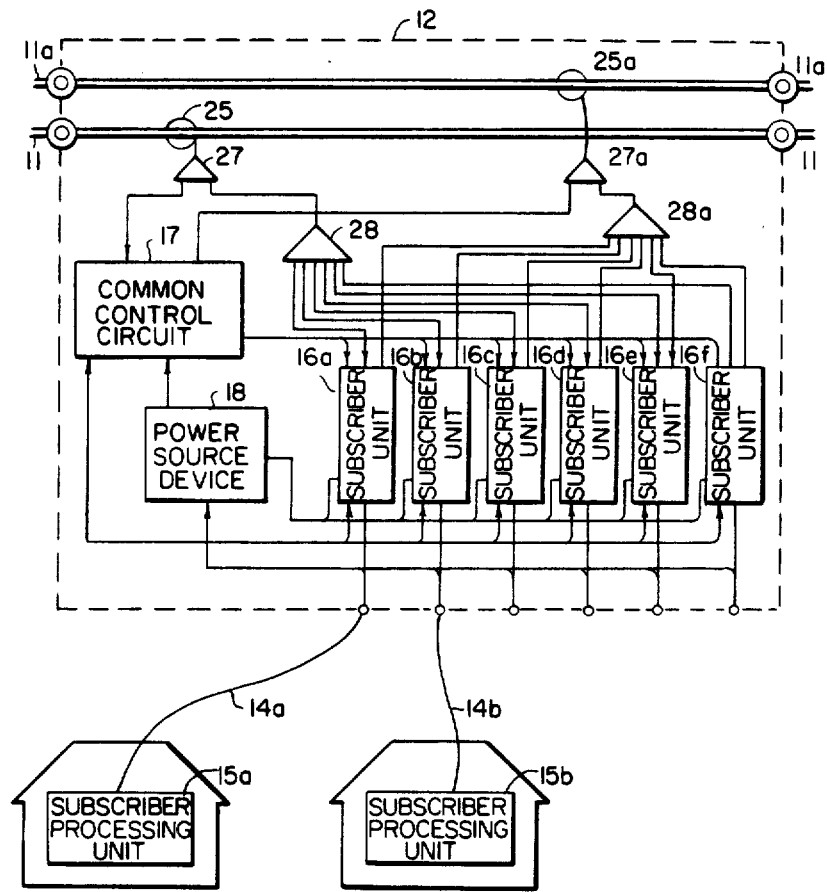
FIG. 3 is a schematic block diagram illustrating an external control unit of the CATV system of FIG. 1.

FIG. 3 is a block diagram of the internal configuration of external control unit 12. Six subscriber units 16a, 16b, 16c, 16d, 16e, and 16f (one for each of six subscribers) are located in external control unit 12. Each subscriber unit 16 includes a converter/tuner for tuning a particular TV channel from among the plurality of TV channels available on the CATV cable and for transmitting the tuned TV channel to the associated subscriber's house via the associated drop cable 14. The signals enter the subscriber's processing unit 15 and then are passed to the subscriber's television set (FIG. 1). The CATV signals are supplied to subscriber units 16a to 16f through directional coupler 25, two-way splitter/distributor 27, and six-way splitter/distributor 28.

The FM audio signal is also applied to subscriber units 16a to 16f through directional coupler 25, two-way splitter/distributor 27, and common control unit 17.

When the subscriber depresses a key on his or her subscriber processing unit 15 (e.g., to select a particular TV channel for viewing), a request signal is generated from the subscriber processing unit and transmitted to external control unit 12 through the subscriber's drop cable 14. The request signal is supplied to common control circuit 17 via the associated subscriber unit 16.

Commmon control circuit 17 includes a memory in which are stored data for each subscriber connected to the external control unit. These data include such information as the subscriber's code number and an identification of the channels to which the subscriber has subscribed. The subscriber data are transmitted to the external control unit from the head end for storage in the external control unit's memory using foward data transmission band B4.

The converter/tuner in each subscriber unit 16 includes a frequency synthesizer using a phase-locked loop. The frequency synthesizer determines the reception channel in accordance with tuning (frequency division) data supplied by common control circuit 17 to a programmable frequency divider in the phase-locked loop circuit.

When a request signal from the subscriber is transmitted to common control circuit 17, the common control circuit determines by interrogating its memory whether or not the requested channel is a subscribed channel. If the subscriber does not fulfill the conditions for receiving the requested TV channel, common control circuit 17 prevents the subscriber from receiving and viewing the requested channel.

A feeder line 11a in addition to feeder line 11 is illustrated in FIG. 3. Feeder line 11a may be connected to external control unit 12 to increase the number of CATV channels available for viewing. In particular, directional coupler 25a, two-way splitter/distributor 27a, and six-way splitter/distributor 28a are provided to double the number of channels that can be made available to subscribers. Common control circuit 17 may cause a subscriber unit to select TV channels on either cable 11 or 11a by sending a command to the subscriber unit to energize a cable selection relay (not shown).

Communication between subscriber processing units 15 and external control unit 12 is accomplished by modulating a carrier frequency with digital data. In the preferred embodiment, a carrier signal of 468 KHz is used to transmit data to external control unit 12 from subscriber processing units 15, and a carrier signal of 430 KHz is used to transmit data in the opposite direction. In transmitting data in either direction, a digital "1" is represented by the presence of carrier, and a digital "0" is represented by the absence of carrier. This type of modulation is referred to herein as on/off or amplitude-shift keying ("ASK") modulation. In this way, subscriber processing units 15a, 15b ... etc. can send channel requests to the common control unit 17 of external control unit 12, and common control circuit 17 can send channel display data corresponding to the request signals to a channel display of subscriber processing units 15.

In the above system, the power consumed by each external control unit 12 is supplied by the subscribers served by that external control unit. A power supply voltage is applied from each subscriber house to power source device 18 via the associated drop cable 14. Outputs from power source unit 18 are supplied to common control circuit 17, subscriber units 16a to 16f, and so on.

Figure 4:
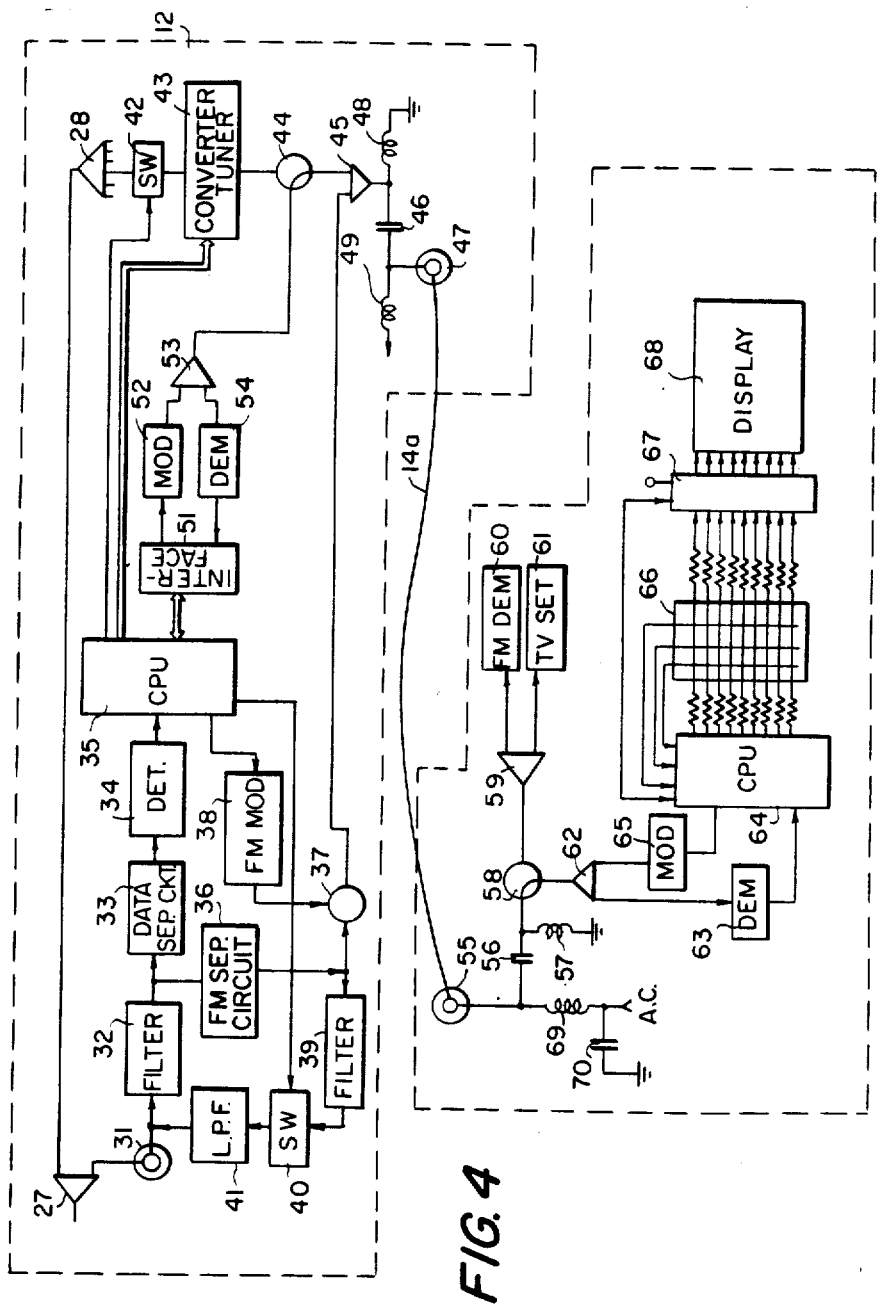
FIG. 4 is a schematic block diagram illustrating apparatus according to an embodiment of the present invention.

FIG. 4 is a block diagram of a data terminal input verification apparatus according to an embodiment of the present invention. As shown in FIG. 4, part of the data verification apparatus is included in external control unit 12 and part is included in typical subscriber processing unit 15a. Reference numeral 31 denotes an input/output terminal which is connected to one terminal of 2-way splitter/distributor 27. Input/output terminal 31 is connected to bandpass filter 32 for separating and extracting the signals of FM audio band B3 and forward data band B4 from the remaining CATV signals. Input/output terminal 31 is also connected to the output terminal of lowpass filter ("LPF") 41 for band-limiting a reverse data transmission signal to band B5.

The output terminal of bandpass filter 32 is connected to (a) data separation circuit 33 for separating and extracting the forward data transmission signal in band B4, and (b) FM separation circuit 36 for separating and extracting the FM audio signal of band B3. The output terminal of data separation circuit 33 is connected to a data detector (demodulator) 34. Data detector 34 detects forward data transmitted from the head end using frequency modulation and generates a digital signal output of logical "0" or "1". This digital data signal is supplied to microcomputer ("CPU") 35. The output terminal of FM separation circuit 36 is connected to splitter/distributor 37. Distributor 37 supplies the FM signal extracted by FM separation circuit 36 to one input terminal of two-way distributor 45.

In addition to receiving forward data transmitted by the head end, CPU 35 causes reverse digital data to be transmited from external control unit 12 to the head end. The reverse data is sent to modulator 38 which modulates the data using binary phase-shift keying ("BPSK"). The modulated reverse data is supplied to bandpass filter 39 through distributor 37. The data signal is filtered by filter 39 and is supplied through switch 40, lowpass filter 41, input/output terminal 31, and two-way splitter/distributor 27 to feeder line 11. Switch 40 is controlled in response to an ON/OFF control signal generated by CPU 35.

CPU 35 supplies channel selection or tuning data to converter/tuner 43 contained, e.g., within subscriber unit 16a (FIG. 3). CATV signals, including signals from bands B1 and B2 (FIG. 2), are supplied to converter/tuner 43 through splitter/distributor 28 and switch 42. The television signal selected or tuned by converter/tuner 43 is supplied to the other input terminal of two-way mixer 45 through directional coupler 44. Television signals from two-way mixer 45 appear at a terminal 47 of external control unit 12 through capacitor 46. Reference numerals 48 and 49 denote coils having high impedances against high frequency signals.

A 468 KHz ASK data signal and an AC power signal are supplied from subscriber processing unit 15a via drop cable 14a to terminal 47 of external control unit 12. The purpose of capacitor 46 and coils 48 and 49 is to separate the AC power coming up drop cable 14a from the CATV and data signals also transmitted by the drop cable. AC power signals flow through coil 49 to common power source device 18 (FIG. 3), and very high-frequency televison, FM, and data signals flow through splitter/distributor 45.

The 468 KHz data signal transmitted from subscriber processing unit 15a is supplied from terminal 47 to the common terminal of two-way splitter/distributor 53 through two-way distributor 45 and directional coupler 44. This data signal is demodulated by ASK demodulator 54 to provide digital ("1" and "0") data. The data demodulated by demodulator 54 is supplied to CPU 35 through interface circuit 51.

CPU 35 also serves to transmit data to subscriber processing unit 15a. Such data is supplied from CPU 35 through interface circuit 51 to ASK modulator 52. The data from CPU 35 is thus modulated to an ASK signal wherein a "1" is represented by the presence of carrier and a "0" is represented by the absence of carrier. This ASK signal is transmitted through two-way distributor 53, directional coupler 44, and two-way distributor 45 to terminal 47.

The ASK signal appearing at terminal 47 is supplied to terminal 55 of subscriber processing unit 15a through drop cable 14a. In turn, the ASK signal appearing at terminal 55 is supplied to the common input terminal of two-way distributor 62 through capacitor 56 and directional coupler 58. The AC power signal is applied to drop cable 14 via inductor 69 and capacitor 70. Capacitor 56 and inductor 57 prevent this power signal from being applied to directional coupler 58 but pass higher frequency television, FM audio and ASK data signals between terminal 55 and directional coupler 58.

The ASK data signal transmitted from external control unit 12 is supplied from one output terminal of two-way distributor 62 to ASK demodulator 63. The output of ASK demodulator 63 is digital data which is supplied to CPU 64 in subscriber processing unit 15a. CPU 64 decodes and processes the digital data. The data includes display data corresponding to a channel request entered by the suscriber on a keypad of subscriber processing unit 15a.

CPU 64 also produces data corresponding to a tuning request signal. This output data is supplied to ASK modulator 65. The resulting 430 KHz ASK signal from ASK modulator 65 appears at terminal 55 through two-way distributor 62, directional coupler 58, and capacitor 56. The 430 KHz ASK signal is then transmitted to terminal 47 of external control unit 12 through drop cable 14a.

The output from directional coupler 58 is supplied to two-way distributor 59. The signals supplied to distributor 59 are the television signal selected by converter/tuner 43 and the FM audio signal separated by FM separation circuit 36. The distribution output terminals of two-way distributor 59 are coupled to the subscriber's television receiver 61 and FM demodulator (radio receiver) 60, respectively.

A means for supplying a tuning request signal to CPU 64 in subscriber processing unit 15a will now be described.

Reference numeral 66 denotes a keyboard, which may be a conventional row and column matrix keyboard. Keyboard 66 has 10 numeric keys from 0 to 9. When the subscriber depresses any one of the keys, a signal corresponding to the depressed key appears on a particular row and column. This signal is read by CPU 64. When CPU 64 receives the signal (request signal) from keyboard 66, CPU 64 transmits a request signal to external control unit 12 by means of the 430 KHz data signals described above.

Figure 5:
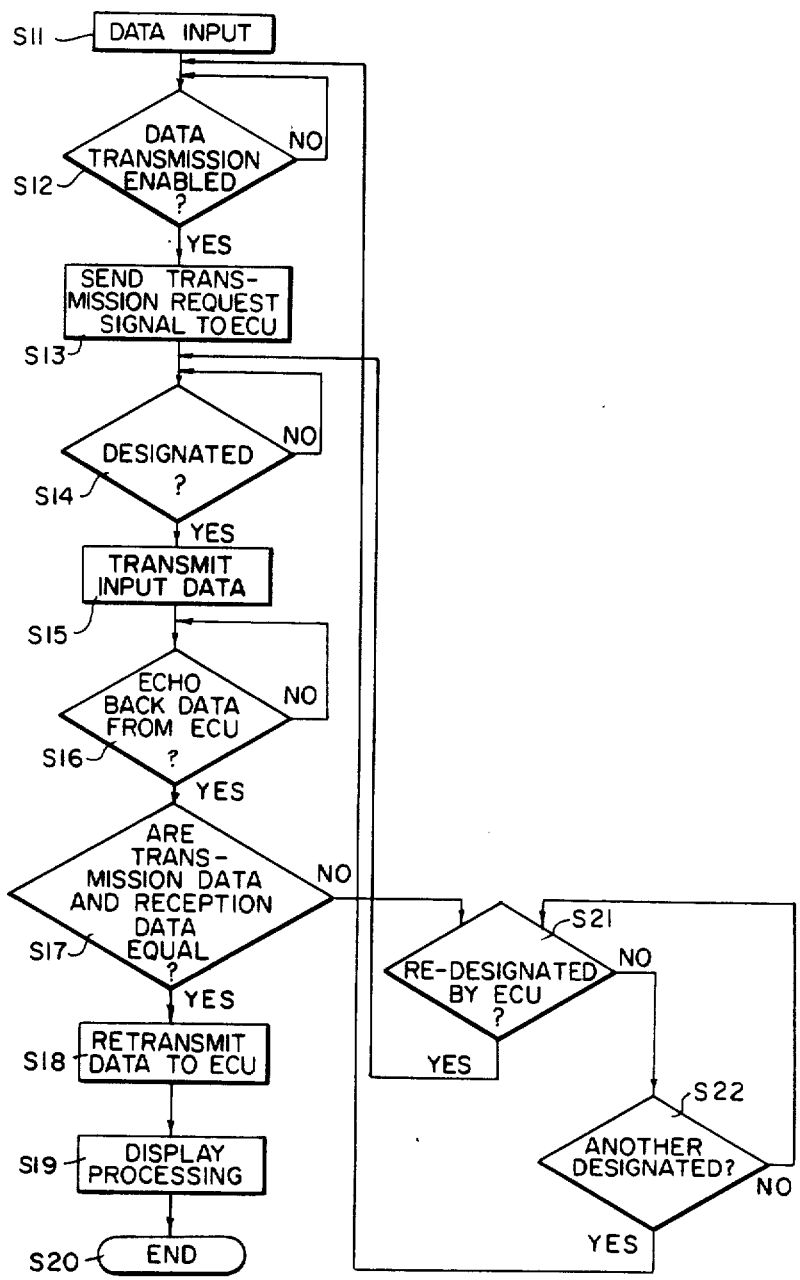
FIG. 5 is a flow chart of a program used in the device shown in FIG. 4.

FIG. 5 is a flow chart of a program stored in CPU 64 to control data communication conditions between CPUs 35 and 64. In step S11, a key input at keyboard 66 of subscriber processing unit 15a is read by CPU 64. If a key has been pressed, CPU 64 reads the keyboard entry and proceeds to step S12. In step S12, CPU 64 checks whether or not data communication request transmission is enabled. If not, CPU 64 loops until data transmission is enabled. Otherwise, the flow advances to step S13. In step S13, CPU 64 provides a communication request signal to ASK modulator 65. Modulator 65 ASK modulates the request signal on a 468 KHz carrier and transmits the signal to external control unit 12. At external control unit 12, the communication request signal is demodulated by ASK demodulator 54. The demodulated signal is supplied to CPU 35 via interface circuit 51. When CPU 35 detects the communications request signal from CPU 64 of subscriber processing unit 15a, CPU 35 transmits a data request or designation signal (including data which uniquely identifies subscriber processing unit 15a) to subscriber processing unit 15a by means of the 430 KHz data signals described above. At step S14, CPU 64 continuously transmits the communication request signal to external control unit 12 until CPU 35 transmits a signal designating subscriber processing unit 15a. Data uniquely identifying subscriber processing unit 15a is included in the data request or designation signal so that two or more substantially independent subscriber processing units, each having a different and unique address, can be connected to a single drop cable if desired. In this way, a single subscriber can have two subscriber processing units, each attached to a different one of two television receivers, to independently request and simultaneously receive two different television channels via a single drop cable.

When CPU 64 receives and decodes (step S14) a designation signal which includes data identifying subscriber processing unit 15a, CPU 64 starts transmission of the digital tuning request signal (step S15) via the 468 KHz data channel. When CPU 35 receives the tuning request signal data, CPU 35 sends back to CPU 64 via the 430 KHz data channel answer back or echo back (verification) data having the same content as the received data. When CPU 64 receives the verification data (step S16), CPU 64 compares that data with the tuning request signal data (step S17). If the verification data is identical to the tuning request signal data, the flow advances to step S18, and the tuning request signal data is retransmitted by CPU 64 to CPU 35. The routine then advances to step S19. In step S19, the verification data received by CPU 64 is supplied to latch circuit 67 (FIG. 4). The verification data is then displayed on display 68, which may be one or more conventional seven-segment displays, and the flow is ended (step S20).

In step S17, if the verification data is not identical to the tuning request signal data, the program flow branches to step S21. In step S21, CPU 64 awaits retransmission of a designation signal from CPU 35. That is, CPU 64 checks whether or not subscriber processing unit 15a is still designated by CPU 35. If CPU 64 determines in step S21 that the designation signal for subscriber processing unit 15a from CPU 35 is present, the program flow returns to step S14 so that CPU 64 may again transmit its data to CPU 35. Otherwise, step S21 causes the program flow to advance to step S22. In step S22, CPU 64 checks whether or not another subscriber processing unit (e.g., unit 16b) has been designated to communicate with CPU 35. If NO in step S22, the routine returns to step S21, and if YES, the flow returns to step S12.

Figure 6:
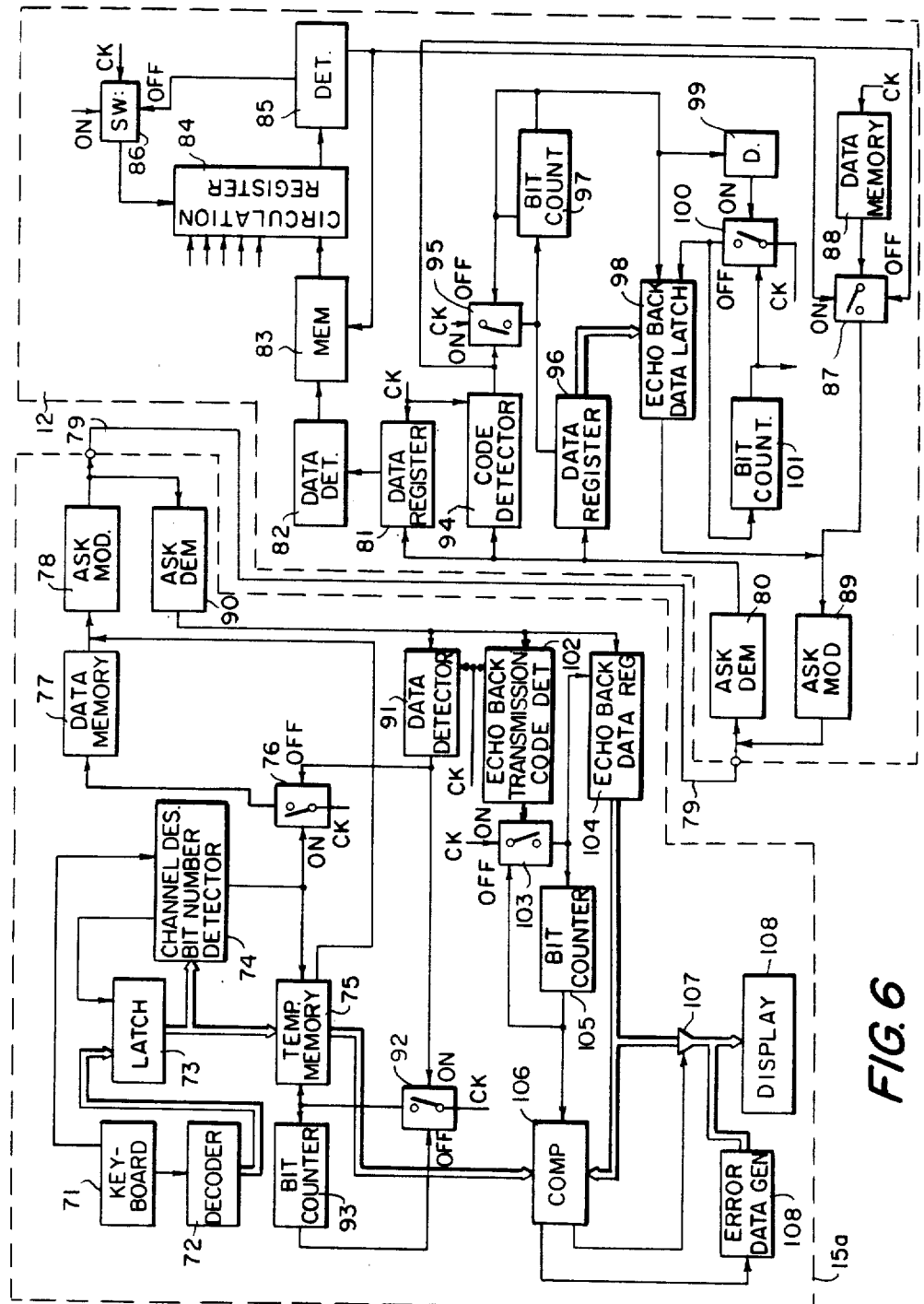
FIG. 6 is a more detailed block diagram illustrating apparatus according to an embodiment of the present invention.

FIG. 6 is a block diagram showing the detailed configuration of an embodiment of the invention. In FIG. 6, part of a typical subscriber processing unit is denoted as item 15a, and part of an associated external control unit is denoted as item 12.

Referring first to the circuitry of subscriber processing unit 15a, operation of one of the keys of keyboard 71 produces a signal which is converted by decoder 72 to digital data. Keyboard 71 may, for example, be a conventional matrix keyboard, and decoder 72 may be a conventional decoder for converting the row and column input of keyboard 71 to parallel digital data. The digital data output by decoder 72 is latched in latch circuit 73. If the latched data is channel tuning data (i.e., a number in the range 0 to 9), this tuning data is detected by channel designation bit number detector 74. Detector 74 is operated for a predetermined time interval after keyboard 71 is operated. During this predetermined time interval, if the operator fails to enter proper channel designation digits (e.g., the operator enters a channel not within the range of available channels), latch circuit 73 is cleared by detector 74. If proper channel designation data is latched by circuit 73, detector 74 supplies a detection (read) pulse to temporary memory 75 and to ON control terminal of switch 76. The detection pulse causes channel designation data latched in latch circuit 73 to be transferred to temporary memory 75.

Simultaneously, the detection pulse applied to the ON terminal of switch 76 causes switch 76 to turn on and to connect a read clock signal ("CK") to communication request data memory 77. Application of the CK signal to memory 77 causes memory 77 to output a pre-determined sequence of digital bits representative of a unique communication request signal. This communication request data is supplied to ASK modulator 78, which modulates a 468 KHz carrier signal with the digital communication request data. ASK modulator 78 applies the modulated signal to drop cable 79, which in turn transmits the signal to external control unit 12.

In external control unit 12, the communication request data is demodulated by ASK demodulator 80, which in turn supplies the signal to communication request data register 81. When the communication request data is properly stored in the register 81, the data is detected by communication request data detector 82. Communication request data detector 82 generates a detect signal of "1" when it detects the unique communication request data, and a "0" if such data is not detected. The detect signal is stored in detection signal memory 83. The content of detection signal memory 83 is read by circulating search register 84. When detection signal memory 83 contains a logical "1", the detection signal is supplied to "1" detector 85 which supplies an OFF signal to switch 86 to interrupt the passage of clock ("CK") signals to circulating search register 84. As a result, circulating search register 84 is temporarily disabled and will not detect the logic state of any other detection signal memory 83, i.e., the detection signal memory associated with any other subscriber served by external control unit 12.

Detector 85 supplies a clear signal to detection signal memory 83 and an ON signal to switch 87. Designation data from designation data memory 88 is supplied to ASK modulator 89 through switch 87. The designation data from memory 88 is a predetermined digital code associated with the particular subscriber processing unit 15a which sent the communication request signal. ASK modulator 89 modulates a 430 KHz carrier signal with the designation data for transmission to subscriber processing unit 15a via drop cable 79.

At subscriber processing unit 15a, ASK demodulator 90 receives and demodulates this designation data. The predetermined code of the designation data is then detected by designation data detector 91.

When designation data detector 91 detects the designation data, a detection pulse is supplied (a) as an OFF signal to switch 76, and (b) as an ON signal to switch 92. The OFF signal interrupts the read clock signal from clocking communication request data memory 77, thus terminating transmission of communication request data to external control unit 12. The ON signal enables a data read clock signal to be supplied to temporary memory 75 through switch 92. It will be recalled that temporary memory 75 contains the channel designation data entered by the subscriber. The channel designation data stored in temporary memory 75 has a predetermined number of bits. The clock pulses supplied to temporary memory 75 are counted by bit counter 93. When the count of bit counter 93 has reached a value corresponding to the predetermined number of bits of the channel designation data, switch 92 is turned off in response to an output from bit counter 93.

The clock pulses passed by switch 92 to bit counter 93 and temporary memory 75 cause the channel designation data stored in temporary memory 75 to be read out as serial data. These data are supplied to ASK modulator 78. The serial data are modulated by ASK modulator 78 and transmitted to external control unit 12 as a channel request signal.

At external control unit 12, the channel request signal is supplied to ASK demodulator 80, where the signal is demodulated. The start portion of the channel designation data includes a predetermined channel data transmission code.

The channel data transmission code is detected by channel data transmission code detector 94. When channel data transmission code detector 94 detects the channel data transmission code, it supplies a detection output as an ON signal for turning on switch 95 and as an OFF signal for turning off switch 87. The transmission by external control unit 12 of designation data (via memory 88) is thus stopped, and a read clock is supplied to channel designation data register 96 through switch 95. Because the channel designation data has a predetermined number of bits, switch 95 allows the passage of a number of clock pulses equaling that number of bits. This is accomplished by bit counter 97. Each clock pulse passed is counted by bit counter 97. When the count of bit counter 97 reaches the predetermined value, an output from bit counter 97 is used to turn off switch 95. The result of this operation is that data register 96 holds the transmitted channel designation data.

The output from bit counter 97 is also supplied as a latch pulse to latch circuit 98 and as an ON signal to the control terminal of switch 100 through delay circuit 99. As a result, latch circuit 98 latches the channel designation data stored in channel designation data register 96. The data latched by latch circuit 98 is used as the answer back or verification data. More particularly, when switch 100 is turned on, a clock ("CK") signal is supplied to latch circuit 98. The channel designation data is then supplied as serial data from latch circuit 98 to ASK modulator 89. This serial data is then ASK modulated by ASK modulator 89 onto a 430 KHz carrier for transmission over drop cable 79 to subscriber processing unit 15a. The start portion of the channel designation data includes a unique answer back transmission code, and the number of bits of data read out from latch 98 is predetermined. The read clocks are counted by bit counter 101. When the count of bit counter 101 has reached a value corresponding to the predetemined number of bits of data read out from latch circuit 98, bit counter 101 generates a signal which turns off switch 100, thus interrupting the clock pulses clocking latch 98. The signal from bit counter 101 is also used to turn ON switch 86, thus enabling operation of circulating search register 84.

At subscriber processing unit 15a, the modulated answer back data is received and demodulated by ASK demodulator 90. The start portion of the answer back data includes the answer back data transmission code. This unique code is detected by echo back data transmission code detector 102.

When detector 102 detects the echo back data transmission code, detector 102 provides a detection pulse to turn ON switch 103. When switch 103 is turned on, a read clock ("CK") signal is supplied to echo back data register 104 to cause register 104 to store the ASK demodulated echo back data. Because the number of bits of echo back data is predetermined, bit counter 105 counts the number of read clocks until the count of counter 105 reaches a value corresponding to the predetermined number of bits of the echo back data. When the count has reached this predetermined number, bit counter 105 generates a signal to turn OFF switch 103, and as a comparison start pulse for conventional comparator 106.

The output data from temporary memory 75 (which stored the channel designation data entered by the subscriber) is supplied to one input terminal of comparator 106, and the echo back data from echo back data register 104 is supplied to the other input terminal thereof. If the contents of temporary memory 75 and echo back data register 104 are the same, comparator 106 produces a signal to conventional gate 107 to render gate 107 conductive. This causes the contents of echo back data register 104 to pass to conventional display 108. Thus, the subscriber can determine that converter/tuner 43 (FIG. 4) in external control unit 12 has properly tuned to the requested channel.

However, in the event that the contents of temporary memory 75 and echo back data register 104 are different, comparator 106 produces an error pulse to enable error data generator 108. Error data generator 108 may, for example, be a conventional read-only memory containing data representing a predetermined error code. Upon receipt of the error pulse, error data is supplied to display 108 and displayed. Thus, the subscriber can determine that external control unit 12 did not tune to the requested channel.

While preferred embodiments of the invention have been set forth for purposes of the disclosure, modification to the disclosed embodiments may occur to those skilled in the art. Accordingly, the appended claims are intended to cover all embodiments of the invention and modifications to the disclosed embodiments which do not depart from the spirit or scope of the invention.

What is claimed is:

1. A data transmission line diagnostic device comprising:

a transmission line;

a first electronic device for receiving manually entered input data, said first electronic device being connected to one end of said transmission line;

a second electronic device connected to another end of said transmission line;

first data processing means located in said first electronic device for receiving said manually entered input data and for generating data corresponding to said manually entered data;

first modulating means located in said first electronic device for modulating the data from said first data processing means and for transmitting modulated data to said second electronic device through said transmission line;

first demodulating means located in said second electronic device for demodulating the modulated data from said first modulating means and converting the demodulated data to digital data;

second data processing means for receiving the digital data from said first demodulating means and for generating echo back data having the same content as that of the digital data;

second modulating means for modulating the echo back data from said second data processing means and for transmitting modulated echo back data to said first electronic device through said transmission line;

second demodulating means located in said first electronic device for demodulating the modulated echo back data from said second modulating means and for reproducing the echo back data;

verification means located in said first data processing means for comparing the demodulated echo back data from said second demodulating means with the manually entered input data and for visually displaying the echo back data; and means for visually displaying error display data when a noncoincidence between the demodulated echo back data and the manually entered input data is detected by said verification means, for alerting a user to defects in said transmission line and for indicating a need for transmission line maintenance.

2. A data transmission line diagnostic device comprising:

a transmission line;

a first electronic device connected to said transmission line for receiving input data;

first data processing means associated with said first electronic device for receiving the input data and for generating data corresponding to the input data;

first transmitting means associated with the first electronic device for transmitting the data generated by said first data processing means to a second electronic device through the transmission line;

second data processing means associated with said second electronic device and responsive to the generated data for generating echo back data corresponding to the transmitted data;

second transmitting means associated with said second electronic device for transmitting the echo back data to said first electronic device through said transmission line, comparing means associated with said first electronic device for comparing said transmitted echo back data with said generated data; and means associated with said first electronic device and responsive to said comparing means for visually displaying the transmitted echo back data in the event that the transmitted echo back data are identical to the generated data, and for displaying error data in the event that said transmitted echo back data and said generated data are different, for alerting a user to defects in said transmission line and for indicating a need for transmission line maintenance.

3. The data transmission line diagnostic device of claim 2, wherein each of said first and second data processing means includes a computer.

4. The data transmission line diagnostic device of claim 2, wherein said first and second transmitting means are modulators for converting the generated data and echo back data, respectively, into modulated carrier signals and for transmitting the modulated carrier signals to said second and first electronic devices, respectively, said data transmission line diagnostic device further including first and second demodulators associated with said first and second electronic devices, respectively, for receiving the modulated carrier signals and for converting the modulated carrier signals into digital signals.

5. In a cable television system in which the converter/tuner for converting a desired portion of the television signal on the cable to a television signal suitable for application to a subscriber's television receiver is located in an external control unit remote from the subscriber's premises and is controlled by control signal data originated by a subscriber processing unit in the subscriber's premises and transmitted to the external control unit via the drop cable which conveys the television-suitable signal from the external control unit to the subscriber's television receiver, drop cable diagnostic apparatus for monitoring the integrity of the drop cable by verifying that the external control unit correctly received the control signal data, said diagnostic apparatus comprising:

first means associated with the subscriber processing unit for storing the control signal data transmitted to the external control unit;

second means associated with the external control unit for receiving and storing the transmitted control signal data;

third means associated with the external control unit for retransmitting to the subscriber processing unit via the drop cable the data stored by the second means;

fourth means associated with the subscriber processing unit for receiving and storing the retransmitted data;

fifth means associated with the subscriber processing unit for comparing the data stored by the first and fourth means and for producing an output indication of whether or not the data stored by the first and fourth means are the same; and sixth means for visually displaying the retransmitted data stored by the fourth means.

6. The apparatus defined in claim 5 wherein the control signal data are representative of the portion of the television signal on the cable which the subscriber wishes to have applied to the television receiver.

7. The apparatus defined in claim 5 wherein
the sixth means is further for displaying error message data if the fifth means indicates that the data stored by the first and fourth means are not the same.

* * * * *